(12) United States Patent
Maffeis

(10) Patent No.: US 7,635,154 B2
(45) Date of Patent: Dec. 22, 2009

(54) PARALLEL PNEUMATIC GRIPPER

(75) Inventor: Giuseppe Maffeis, Roncadelle (IT)

(73) Assignee: GIMATIC S.p.A., Roncadelle, Brescia (IT)

( * ) Notice: Subject to any disclaimer, the term of this patent is extended or adjusted under 35 U.S.C. 154(b) by 414 days.

(21) Appl. No.: 11/561,089

(22) Filed: Nov. 17, 2006

(65) Prior Publication Data

US 2007/0132257 A1 Jun. 14, 2007

(30) Foreign Application Priority Data

Dec. 13, 2005 (IT) .................... BS 2005 A 000156

(51) Int. Cl.
 *B25J 15/08* (2006.01)
(52) U.S. Cl. ..................... 294/88; 294/119.1
(58) Field of Classification Search ............ 294/88, 294/119.1, 902; 901/37, 39; 269/27, 32, 269/34

See application file for complete search history.

(56) References Cited

U.S. PATENT DOCUMENTS

| | | | | |
|---|---|---|---|---|
| 2,417,625 A | * | 3/1947 | Bates | ............................ 269/30 |
| 3,940,122 A | * | 2/1976 | Janzen | ............................ 269/23 |
| 4,892,344 A | * | 1/1990 | Takada et al. | ................... 294/88 |
| 5,529,359 A | * | 6/1996 | Borcea et al. | .................. 294/88 |
| 5,595,413 A | * | 1/1997 | McGeachy et al. | ............. 294/88 |
| 5,620,223 A | * | 4/1997 | Mills | ............................ 294/88 |
| 5,839,770 A | * | 11/1998 | Zajac et al. | .................... 294/88 |
| 6,092,848 A | * | 7/2000 | Maffeis et al. | ................. 294/88 |
| 6,273,485 B1 | | 8/2001 | Maffeis et al. | |
| 6,428,070 B1 | * | 8/2002 | Takanashi et al. | .............. 294/88 |
| 6,471,200 B2 | * | 10/2002 | Maffeis | ........................ 269/34 |
| 7,258,378 B2 | * | 8/2007 | Bellandi et al. | ................ 294/88 |
| 7,331,093 B2 | * | 2/2008 | Ferrari | ........................ 29/38 B |

* cited by examiner

*Primary Examiner*—Dean J Kramer
(74) *Attorney, Agent, or Firm*—McGlew and Tuttle, P.C.

(57) ABSTRACT

The invention concerns a parallel pneumatic gripper which includes a gripper body (11) forming a chamber (15), an alternate pneumatic piston (12) movable in the chamber, and two jaws (13, 14) controlled by the piston and movable in opposite directions. A first jaw (13) is rigidly attached to the piston (12) to follow its movements, whereas the second jaw (14) is connected to the piston (12) by an oscillating transmission element or lever (22, 22') comprising an intermediate larger dimensioned cross section portion (23, 30) having a transversal bore to house the oscillating central fulcrum and two terminal heads with rolling surfaces (25, 25'; 31, 31') designed to couple with corresponding seats provided respectively on the bottom of a flaring shaped in one side of the piston (12) and in the second jaw (14).

13 Claims, 3 Drawing Sheets

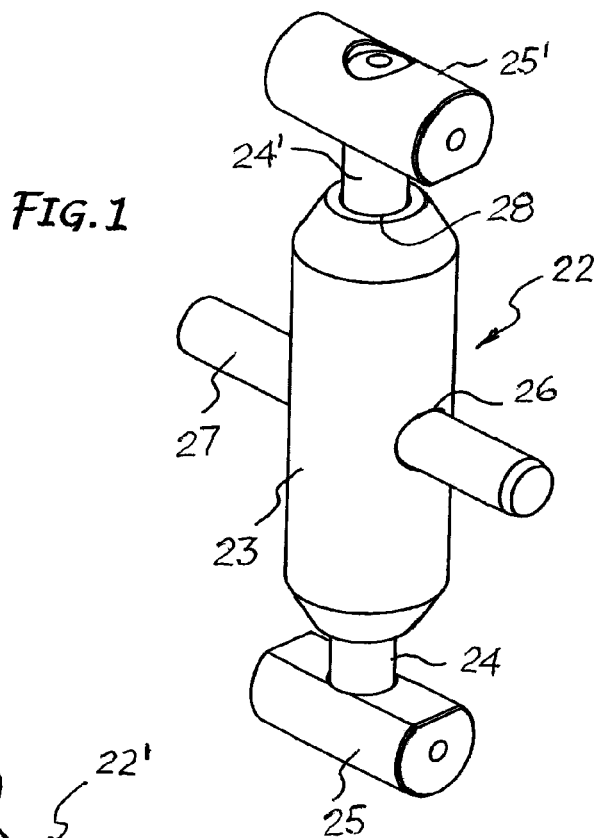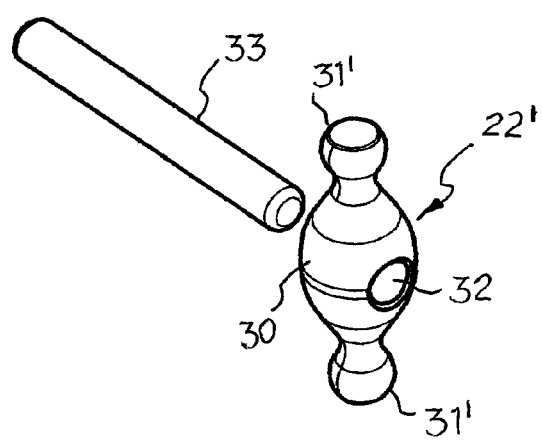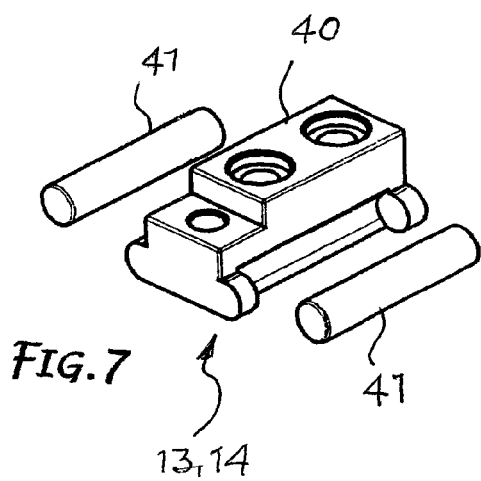

PARALLEL PNEUMATIC GRIPPER

FIELD OF THE INVENTION

This invention concerns in general grippers for gripping and handling pieces, and refers in particular to a parallel pneumatic gripper.

STATE OF THE ART

Pneumatic grippers of the types described in a previous U.S. Pat. No. 6,273,485 by the same applicant are already known and correspond to the preamble of claim 1. They are made up fundamentally of a body forming a chamber closed at the opposite ends by two flanges, an alternate pneumatic piston moving in said chamber, and two jaws guided linearly in a housing formed in said body parallel to said chamber, controlled by said piston and provided with means for gripping and releasing the items to be handled.

The two jaws are moved in opposite directions to each other by the piston. A first jaw is rigidly attached directly to the same piston, whereas the second jaw is connected to the piston by means of a drive lever which oscillates on a central oscillating pin supported in the gripper body and joined, at its ends, by joint pins which are fixed to the piston and second jaw respectively.

However, said grippers, even if operative, resulted from certain aspects, subject to improvement. In fact, in said grippers, the connection lever of the piston to one of the jaws is flat and has rather limited contact surfaces with the joint pins and with the oscillation pin, consequently subject to rapid wear and such as not to allow the development of high blocking power.

Furthermore, with this system the travel of the jaws closely depends on the length of the lever. For increased travel it is necessary to use longer length levers, increasing in this way also the overall size of the body and as a result the gripper. Therefore the stroke of the jaws cannot go beyond certain limits so as not to jeopardize the size of the gripper and the possibility of its use in restricted spaces.

OBJECTS AND SUMMARY OF THE INVENTION

Starting from these assertions, one of the objects of this invention is to provide a pneumatic gripper in which the oscillating lever that connects the control piston to one of the linear jaws has a new and original shape to increase its contact surfaces both in relation to the central oscillating pin and the piston on one side and the matching jaw on the other.

Another object of the invention is to allow, sizes of the gripper being equal, increased strokes and a variation in the stroke of the jaws.

Yet another object is therefore to provide a pneumatic gripper with improved joining conditions between the control piston and the jaw it drives by means of an oscillating lever, in order to improve the functionality and performance of the device, to reduce joining wear and increase the grip and blocking forces on the items to be handled.

A further object of the invention is to propose and provide a pneumatic gripper with simpler and less costly jaws and at the same time which have greater precision in matching with the gripper body.

These objects and the implicit advantages deriving from them are reached, in accordance with the invention, by a parallel pneumatic gripper according to the preamble of claim 1 and characterized in that the oscillating element or lever for motion transmission from the piston to the second jaw includes an intermediate portion with increased cross-section having a transversal bore housing the central oscillating fulcrum and two terminal heads with roll surfaces designed to connect with corresponding seats provided respectively on the bottom of a flare shaped in one side of said piston and in the second jaw.

Such an oscillating lever can then be made using different modes according to the other claims in the appendix.

BRIEF DESCRIPTION OF DRAWINGS

The invention will however be described in greater detail making reference to the enclosed illustrative and not binding drawings, in which:

FIG. 1 is an enlargement of the oscillating transmission element or lever according to a first method of construction;

FIG. 4 is the oscillating transmission element or lever with relative fulcrum according to another construction mode;

FIG. 7 is one of the jaws of the gripper.

DETAILED DESCRIPTION OF THE INVENTION

Figure 2:
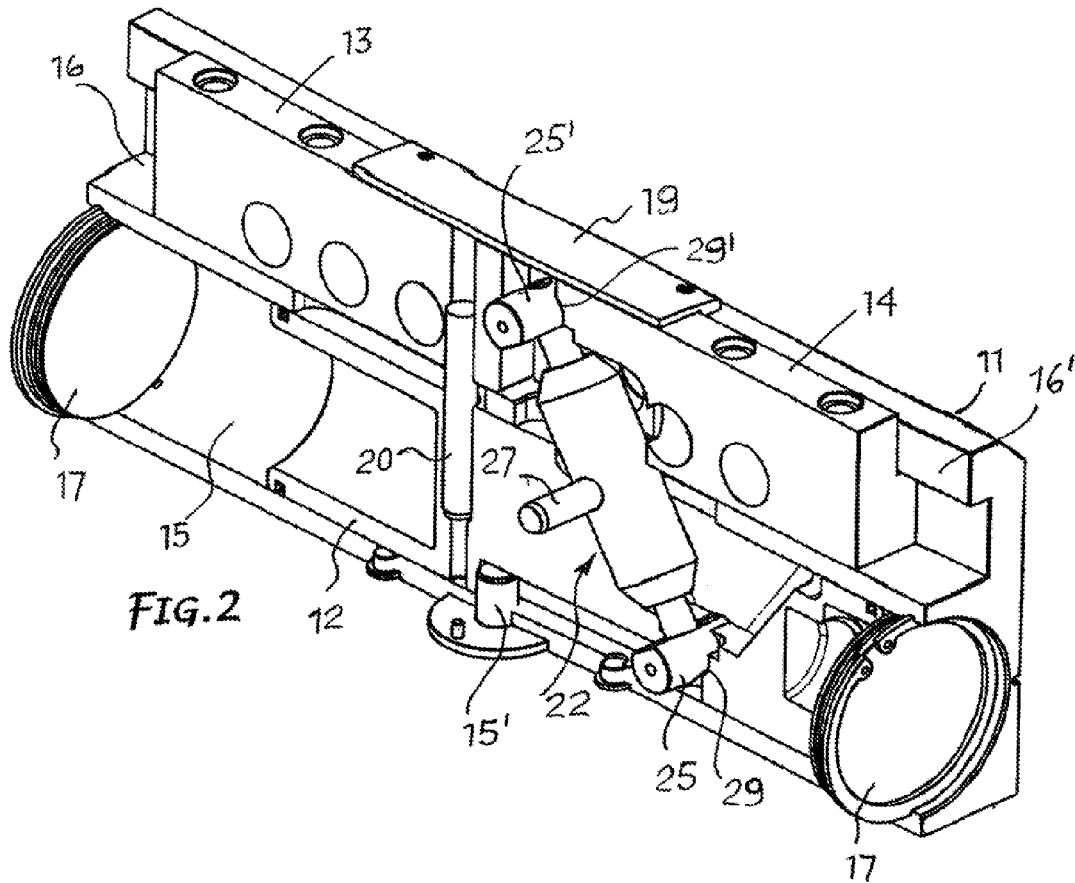
FIG. 2 is a split in perspective of a gripper incorporating the transmission element or lever in FIG. 1.

As shown, the parallel pneumatic gripper comprises fundamentally a gripper body 11, an alternate pneumatic piston 12 and two aligned jaws 13, 14 holding an equal number of shoes 50, 50' configured for gripping and release of an article.

Longitudinally, the gripper body forms a cylindrical chamber 15 and a guide 16 parallel to each other. The opposite ends of the cylindrical chamber 15 are closed by flanges 17. The pneumatic piston 12 is guided and movable in said chamber 15 by alternate motion for a stroke that can be limited by a stop 15'. It is driven by a fluid under pressure delivered to and discharged from said chamber 15 from opposite sides of the piston through inlet/outlet holes 18, 18' connected to conduits for the circulation of said fluid.

Jaws 13, 14 are housed in the guide 16 formed in the gripper body 11 and are movable linearly in opposite directions by means of the piston 12. In particular, said guide 16 can be an upside-down T shape and jaws 13, 14 configured correspondingly so that their top face, designed to hold the gripper shoes, is facing the longitudinal opening 16' of the guide 16. Furthermore, said opening can be partially closed in an intermediate part, astride of the jaws, by means of a protective plate 19 so as to prevent dirt and extraneous material penetrating between the jaws during their alternate movements.

For the movements in opposite directions, a first jaw 13 is radially rigidly attached to the piston 12, so as to strictly follow it movements, by means of a pin 20 which is inserted and moves in a slot 21 provided in the body of the gripper 11 between the chamber 15 and the guide 16. The second jaw 14 is on the other hand connected to the piston 12 by a transmission element or lever 22, oscillating, so that the movement of the piston in one direction corresponds to the movement of the jaw 14 in the opposite one and therefore contrary to the one of the first jaw 13. The oscillating element or lever 22 extends between the piston 12 and the second jaw 14 also passing through a slot 21' provided in the body of the gripper 11 between the chamber 15 and the guide 16.

Figure 3:
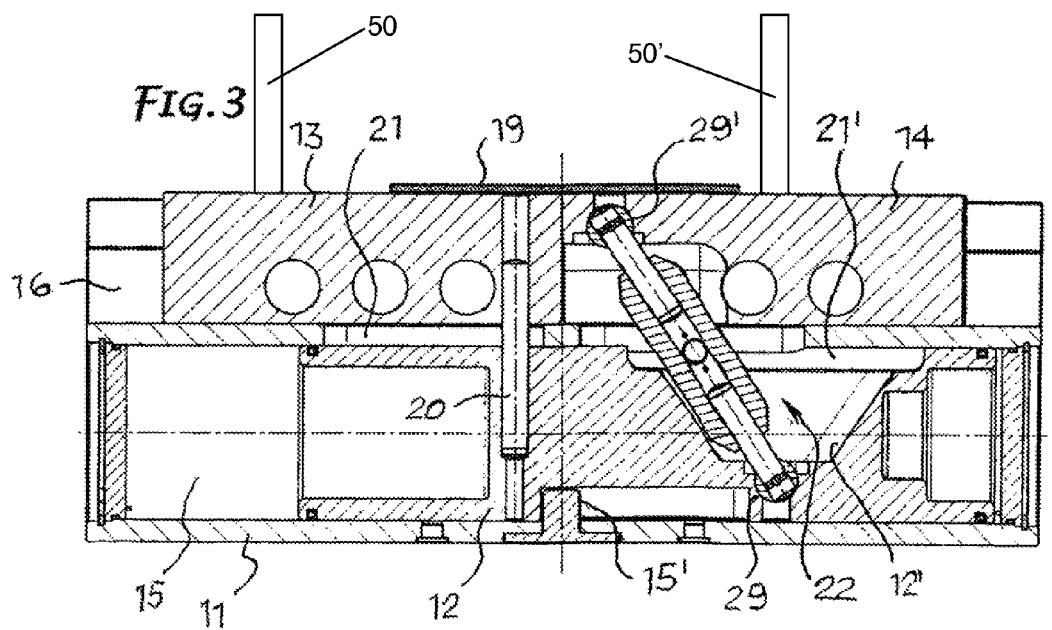
FIG. 3 is a longitudinal section of the gripper in FIG. 2.

In one way of construction—FIGS. 1, 2 and 3—the oscillating element or lever 22 comprises and intermediate portion 23, preferably cylindrical, two extendible legs 24, 24' at the opposite ends of the intermediate portion 23 and two terminal heads 25, 25' at the free ends of said legs, both with roll surfaces, preferably cylindrical or spherical. The intermediate portion 23 has a transversal bore 26 designed to receive a pin acting as a fulcrum 27 for the oscillation of the element or lever 22 in the body of the gripper 11. The extendible legs 24, 24' are facing in opposite directions, housed in an axial bore 28 provided in said intermediate portion 23 with the possibility of retracting and protruding into and out of said axial bore 28. In the illustrated example, the terminal heads 25, 25' are pins, positioned and fixed at right angles to the extendible legs 24, 24' and housed, with the possibility of turning in corresponding almost semi-cylindrical seats 29, 29' provided, respectively, in the bottom of a flaring 12' provided in a side of the piston 12 and crossways to the second jaw 14.

In this way, the oscillating transmission element or lever 22, thanks to fact that it can be extended, is able to change its length to follow the piston stroke and cause the opening and closing movements of the second jaw 14. So, the stroke of the piston can be longer at this point to give the jaw 14 greater travel without being influenced by the transmission element or lever 22, maximum extension limit of the latter permitting. Furthermore, the intermediate portion 23 has a coupling and rolling surface on the central fulcrum 27 which is particularly wide and positive, permitting its support even in the presence of strong forces. On the other side, the heads or terminal pins 25, 25' positioned transversely offer a large contact surface with the control piston 12 and with the second jaw 14, resulting in a more precise and secure coupling and with less friction and wear.

Figure 5:
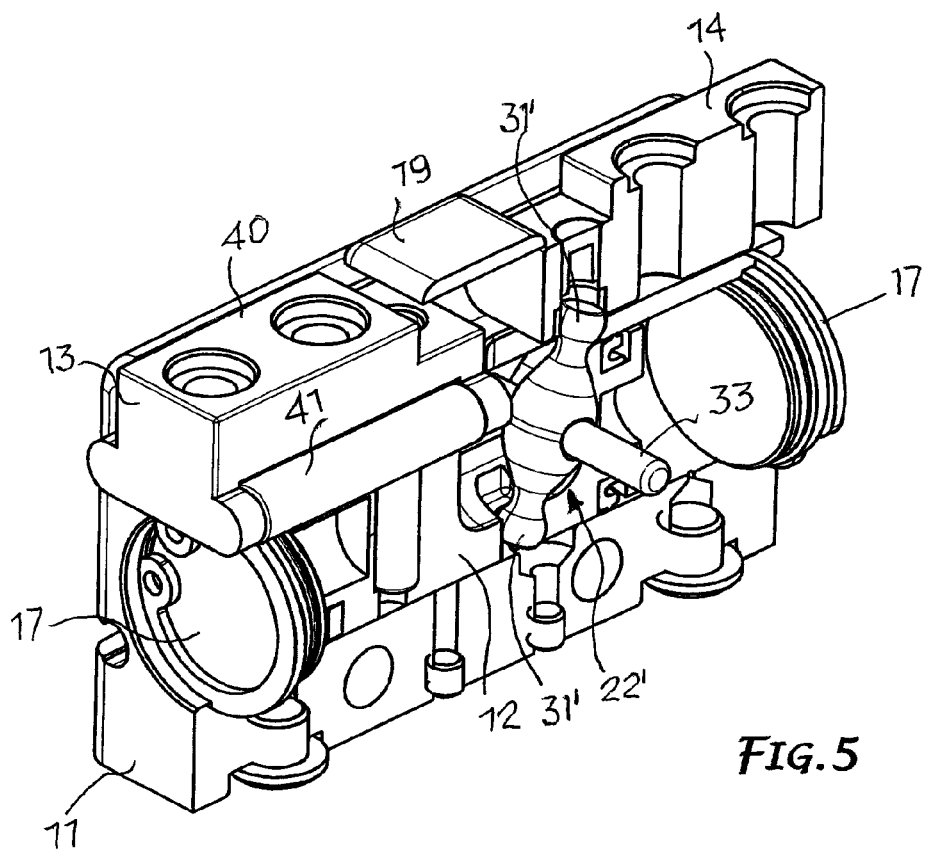
FIG. 5 is a split in perspective of a gripper incorporating the oscillating transmission element or lever in FIG. 4.
Figure 6:
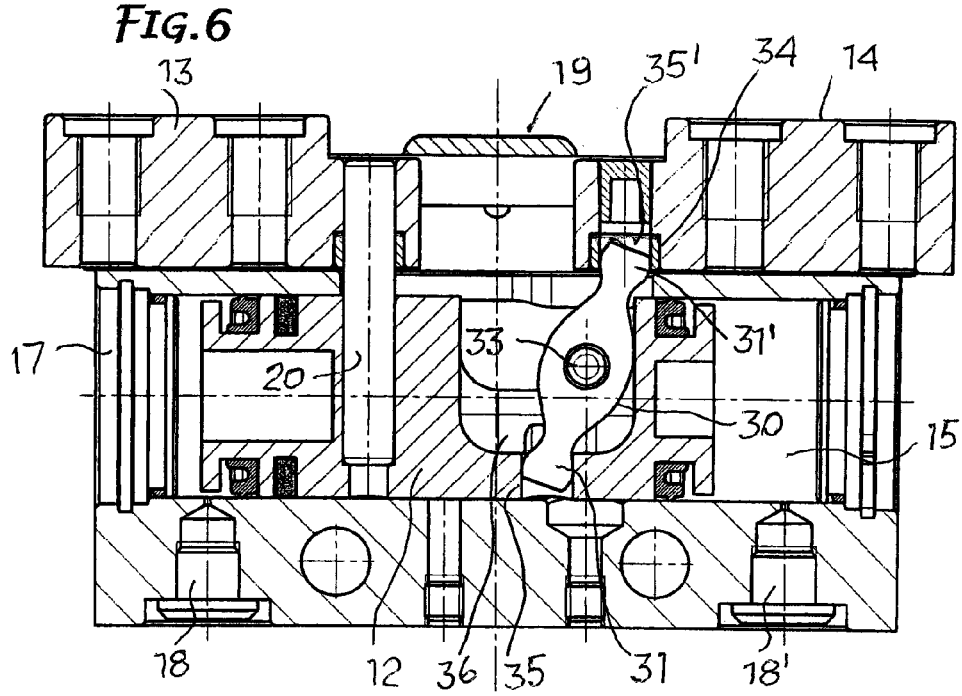
FIG. 6 is a longitudinal section of the gripper in FIG. 5.

In a different construction way, the oscillating transmission element or lever designed by 22' in FIGS. 4, 5 and 6, has a set length and has an intermediate portion to a large extent double-cone 30, that is barrel shaped, and with two substantially spherical terminal heads 31, 31' at its two opposite ends. Centrally, that is to say in the largest sized part of this other transmission element 22', the intermediate portion 30 has a transversal bore 32 to receive the fulcrum 33 for the oscillating mounting in the gripper body 11. Its spherical heads 31, 31' are inserted in and housed, possibly with the interposition of an anti-friction bushing 34, in corresponding seats 35, 35' which are provided respectively on the bottom of a flaring 36 in one side of the piston and in the second jaw 14.

Also in this configuration the oscillating transmission element 22', on the one hand, thanks to the central bore 32 in the largest sized part, has a large rolling surface on the fulcrum 33 and, on the other hand, the spherical heads 31, 31' offer a better and more precise coupling condition with the control piston and with the second controlled jaw 14.

It should also be taken into consideration that in both mode of configuration, the components of the oscillating transmission element or lever 22 or 22' can be made conveniently and with high precision by automatic machine tools and at a reduced cost. According to another aspect of the invention, each of the jaws 13, 14—FIG. 7—can be made with a jaw body 40 cast in a material, for example zama (Zn+Al+Mg alloy) or some other low grade metal, and by two hardened steel rolls 41 inserted on opposite sides if the jaw body 40. In this way, the jaws 13, 14 are much simpler and economical to produce and their lateral rolls 41 act as high precision and high wear resistant bearings for a more dependable and lasting coupling of each jaw with the guide 16 of the gripper body 11 in which it is guided and slides, said guide consequently having in cross section a configuration apt for that of said jaws.

The invention claimed is:

1. A parallel pneumatic gripper comprising:
    a gripper body forming a chamber closed by two end flanges;
    a pneumatic piston moving alternatively in said chamber;
    two jaws guided in a linear guide provided in said body parallel with said chamber, moved in opposite directions to each other by the piston; and
    a holding means for gripping and releasing items to be handled, wherein a first jaw is rigidly attached to the piston to unanimously follow movements of said piston, a second jaw being connected to the piston by means of a transmission element or lever that oscillates on a central support fulcrum in the gripper body, said transmission element or lever having a first end and a second end, said first end being opposite said second end, said first end being coupled with the piston, said second end being coupled with said second jaw, said transmission element or lever comprising an intermediate portion provided with a transversal bore for receiving the central support fulcrum and two terminal heads with rolling surfaces designed to couple with corresponding seats provided respectively on the bottom of a flaring shaped in one side of said piston and in the second jaw, said intermediate portion having a cross section that is greater than a cross section of another portion of said oscillating transmission element or lever, said transmission element or lever varying in length in response to the movement of said piston, said movement of said piston being in a direction opposite a direction of movement of said second jaw.

2. Parallel pneumatic gripper according to claim 1, wherein said transmission element or lever comprises two extendible legs, one of said extendible legs being opposite another of said extendible legs, the intermediate portion of said oscillating transmission element or lever being coupled to said two extendible legs, said terminal heads with rolling surfaces being at free ends of said extendible legs.

3. A parallel pneumatic gripper according to claim 2, wherein said intermediate portion is cylindrical and is provided with a transversal bore to house the central support fulcrum, said extendible legs are guided and move in an axial bore provided in said intermediate portion, and said terminal heads are housed and turn in the seats in one side of the piston and in the second jaw.

4. A parallel pneumatic gripper according to claim 3, wherein the terminal heads are cylindrical, oriented at right angles to said extendible legs and which are housed in substantially semi-cylindrical seats provided in one side of the piston and in the second jaw.

5. A parallel pneumatic gripper according to claim 2, wherein the terminal heads of said extendible legs are substantially spherical and are housed in basically semi-spherical seats provided in one side of the piston and in the base of the second jaw, wherein an anti-friction bushing is inserted between each terminal head and one of said seats.

6. A parallel pneumatic gripper according to claim 1, wherein the intermediate portion of the oscillating transmission element or lever has a double cone shape and has two heads, said two heads being at opposite ends of said intermediate portion.

7. A parallel pneumatic gripper according to claim 6, wherein said intermediate double cone shaped portion is provided with a transversal bore to house the central support fulcrum and said terminal heads are spherical and are housed in basically semi-spherical seats provided in one side of the piston and in the second jaw, wherein an anti-friction bushing is inserted between each terminal head and one of said seats.

8. A parallel pneumatic gripper according to claim 1, wherein each jaw comprises a jaw body made of a material and of two rolls made out of another material positioned along the opposite sides of the jaw body and acting as sliding bearings for the movements of the jaw in the guide of the gripper body.

9. A parallel pneumatic gripper according to claim 8, wherein the jaw body is cast in zama (Zn+Al+Mg alloy) or other material and the rolls acting as bearings are made of hardened steel.

10. A parallel pneumatic gripper comprising:
- a gripper body forming a chamber closed by two end flanges;
- a pneumatic piston moving alternatively in said chamber;
- two jaws guided in a linear guide provided in said body parallel with said chamber, moved in opposite directions to each other by the piston; and
- a holding means for gripping and releasing items to be handled, wherein a first jaw is rigidly attached to the piston to unanimously follow movements of said piston, a second jaw being connected to the piston by means of a transmission element or lever that oscillates on a central support fulcrum in the gripper body, said transmission element or lever having a first end and a second end, said first end being opposite said second end, said first end being coupled with the piston, said second end being coupled with said second jaw, said transmission element or lever comprising an intermediate portion provided with a transversal bore for receiving the central support fulcrum and two terminal heads with rolling surfaces designed to couple with corresponding seats provided respectively on the bottom of a flaring shaped in one side of said piston and in the second jaw, said intermediate portion having a cross section that is greater than a cross section of another portion of said oscillating transmission element or lever, wherein said transmission element or lever comprises two extendible legs, one of said extendible legs being opposite another of said extendible legs, said intermediate portion of said oscillating transmission element or lever being coupled to said two extendible legs, said terminal heads with rolling surfaces being at free ends of said extendible legs.

11. A parallel pneumatic gripper comprising:
- a gripper body forming a chamber closed by two end flanges;
- a pneumatic piston moving alternatively in said chamber;
- two jaws guided in a linear guide provided in said body parallel with said chamber, moved in opposite directions to each other by the piston; and
- a holding means for gripping and releasing items to be handled, wherein a first jaw is rigidly attached to the piston to unanimously follow movements of said piston, a second jaw being connected to the piston by means of a transmission element or lever that oscillates on a central support fulcrum in the gripper body, said transmission element or lever having a first end and a second end, said first end being opposite said second end, said first end being coupled with the piston, said second end being coupled with said second jaw, said transmission element or lever comprising an intermediate portion provided with a transversal bore for receiving the central support fulcrum and two terminal heads with rolling surfaces designed to couple with corresponding seats provided respectively on the bottom of a flaring shaped in one side of said piston and in the second jaw, said intermediate portion having a cross section that is greater than a cross section of another portion of said oscillating transmission element or lever, said transmission element or lever comprising two extendible legs, one of said extendible legs being opposite another of said extendible legs, said intermediate portion of said oscillating transmission element or lever being coupled to said two extendible legs, said terminal heads with rolling surfaces being at free ends of said extendible legs, said intermediate portion being cylindrical, said intermediate portion comprising a transversal bore to house the central support fulcrum, wherein said extendible legs are guided and move in an axial bore provided in said intermediate portion, and said terminal heads are housed and turn in the seats in one side of the piston and in the second jaw.

12. A parallel pneumatic gripper comprising:
- a gripper body forming a chamber closed by two end flanges;
- a pneumatic piston moving alternatively in said chamber;
- two jaws guided in a linear guide provided in said body parallel with said chamber, moved in opposite directions to each other by the piston; and
- a holding means for gripping and releasing items to be handled, wherein a first jaw is rigidly attached to the piston to unanimously follow movements of said piston, a second jaw being connected to the piston by means of a transmission element or lever that oscillates on a central support fulcrum in the gripper body, said transmission element or lever having a first end and a second end, said first end being opposite said second end, said first end being coupled with the piston, said second end being coupled with said second jaw, said transmission element or lever comprising an intermediate portion provided with a transversal bore for receiving the central support fulcrum and two terminal heads with rolling surfaces designed to couple with corresponding seats provided respectively on the bottom of a flaring shaped in one side of said piston and in the second jaw, said intermediate portion having a cross section that is greater than a cross section of another portion of said oscillating transmission element or lever, said transmission element or lever comprising two extendible legs, one of said extendible legs being opposite another of said extendible legs, said intermediate portion of said oscillating transmission element or lever being coupled to said two extendible legs, said terminal heads with rolling surfaces being at free ends of said extendible legs, said intermediate portion being cylindrical, said intermediate portion comprising a transversal bore to house the central support fulcrum, wherein said extendible legs are guided and move in an axial bore provided in said intermediate portion, and said terminal heads are housed and turn in the seats in one side of the piston and in the second jaw, said terminal heads being cylindrical, said terminal heads being oriented at right angles to said extendible legs, said terminal heads being housed in substantially semi-cylindrical seats provided in one side of the piston and in the second jaw.

13. A parallel pneumatic gripper comprising:
- a gripper body forming a chamber closed by two end flanges;
- a pneumatic piston moving alternatively in said chamber;
- two jaws guided in a linear guide provided in said body parallel with said chamber, moved in opposite directions to each other by the piston; and a holding means for gripping and releasing items to be handled, wherein a first jaw is rigidly attached to the piston to unanimously follow movements of said piston, a second jaw being connected to the piston by means of a transmission element or lever that oscillates on a central support fulcrum in the gripper body, said transmission element or lever having a first end and a second end, said first end being opposite said second end, said first end being coupled with the piston, said second end being coupled with said second jaw, said transmission element or lever comprising an intermediate portion provided with a transversal bore for receiving the central support fulcrum and two terminal heads with rolling surfaces designed to couple with corresponding seats provided respectively on the bottom of a flaring shaped in one side of said piston and in the second jaw, said intermediate portion having a cross section that is greater than a cross section of another portion of said oscillating transmission element or lever, said transmission element or lever varying in length in response to the movement of said piston, said movement of said piston being in a direction opposite a direction of movement of said second jaw, said intermediate portion of said oscillating transmission element or lever being coupled to two extendible legs facing in opposite directions, wherein said terminal heads with rolling surfaces are at free ends of said extendible legs.

* * * * *